| United States Patent [19] | [11] | 4,439,811 |
|---|---|---|
| Sasaki et al. | [45] | Mar. 27, 1984 |

[54] CAPACITOR

[75] Inventors: Tohru Sasaki; Mutsuru Ohta; Syuuzi Terasaki; Shozo Kakizaki, all of Iwaki, Japan

[73] Assignee: Kureha Kagaku Kogyo Kabushiki Kaisha, Tokyo, Japan

[21] Appl. No.: 444,746

[22] Filed: Nov. 26, 1982

Related U.S. Application Data

[63] Continuation-in-part of Ser. No. 315,750, Oct. 28, 1981, abandoned.

[30] Foreign Application Priority Data

Oct. 31, 1980 [JP] Japan ................................. 55-154140

[51] Int. Cl.$^3$ ........................ H01G 3/17; H01G 4/06
[52] U.S. Cl. ..................................... 361/313; 361/323
[58] Field of Search ............... 29/25.42; 428/421, 422; 361/312, 313, 323

[56] References Cited

U.S. PATENT DOCUMENTS

| 3,430,116 | 2/1969 | Johnstone | 361/323 X |
| 3,715,639 | 2/1973 | Gaines et al. | 361/323 X |
| 3,724,043 | 4/1973 | Eustance | 29/25.42 |
| 3,991,451 | 11/1976 | Maruyama et al. | 29/25.42 |
| 4,141,873 | 2/1979 | Dohany | 428/421 |
| 4,298,719 | 11/1981 | Mizuno et al. | 428/421 |

Primary Examiner—Donald A. Griffin
Attorney, Agent, or Firm—Woodcock, Washburn, Kurtz, Mackiewicz & Norris

[57] ABSTRACT

The capacitor contains a film layer comprising essentially a vinylidene fluoride resin and a coating layer composed of a mixture of the vinylidene fluoride resin and a polymer substantially incompatible with the vinylidene fluoride resin and having a critical surface tension of 30 dyn/cm or higher.

The capacitor components as set forth hereinabove can render the capacitor compact without decreasing the performance inherent in the polyvinyl fluoride resin.

8 Claims, No Drawings

CAPACITOR

CROSS-REFERENCE TO RELATED APPLICATION

This is a continuation-in-part application of Ser. No. 315,750, filed Oct. 28, 1981 titled "CONDENSER" and now abandoned.

BACKGROUND OF THE INVENTION

1. Field of the Invention

The present invention relates to a capacitor in which a stretch-oriented synthetic resin film is employed for a dielectric layer.

2. Brief Description of the Prior Art

As polyvinylidene fluoride films have a dielectric constant about three to six times as much as that of other plastic films and are superior in withstand voltage performance, they may provide a very small capacitor as compared with conventional capacitors.

Polyvinylidene fluoride films, however, are as poor as or poorer than other plastic films in impregnation with an insulating oil or the like so that they cannot utilize their properties fully even where they are employed for capacitors. The polyvinylidene fluoride films can little be penetrated and get wet with an impregnant due to physical and chemical properties on their surface. Even if they are impregnated with an impregnant, portions that are not impregnated with the impregnant would occur in the film so that they may cause a corona discharge at a high voltage, whereby the film is deteriorated and, as a result, the insulation of the capacitor would get rise to a damage.

In order to improve the poor impregnation of the plastic films for use with capacitor, the prior art technique generally employs a so-called composite dielectric element prepared by superposing the film or films with a sheet or sheets of insulating paper and winding the superposed material on themselves in a roll. In the case of polyvinylidene fluoride films, it may be possible to improve their impregnating ability to some extent by forming a composite element with insulating paper. In this case, however, the dielectric constant and the withstand voltage performance of the insulating paper is considerably lower than those of the polyvinylidene fluoride films so that the use of such composite dielectric element cannot provide a sufficient effect with respect to reduction of the capacitor size and improvement in withstand voltage performance.

OBJECTS AND SUMMARY OF THE INVENTION

Therefore, an object of the present invention is to provide a capacitor that is rendered reduced size and has an improved withstand voltage performance.

Another object of the present invention is to provide a capacitor in which a polyvinylidene fluoride film having a good impregnating ability is employed for a dielectric layer.

In accordance with one aspect of the present invention, there is provided a capacitor in which an at least uniaxially stretch-oriented film is employed, the film comprising (a) a dielectric layer comprising from 95 to 100% by weight of a vinylidene fluoride resin and (b) a coating layer comprising a mixture of a vinylidene fluoride resin and a polymer substantially incompatible with the vinylidene fluoride resin and having a critical surface tension of approximately 30 dyn/cm or higher and the coating layer being disposed on at least one of the surfaces of the dielectric layer.

DETAILED DESCRIPTION OF THE PREFERRED EMBODIMENTS

The capacitors in accordance with the present invention contain a dielectric layer in which an at least uniaxially stretch-oriented film comprising a vinylidene fluoride resin is used. The dielectric layer is laminated on at least one side thereof with a coating layer. The term "vinylidene fluoride resin" is intended to include a vinylidene fluoride homopolymer and a copolymer containing the vinylidene fluoride units in an amount of more than 50 mol%. Monomers copolymerizable with the vinylidene fluoride units may include, for example, ethylene trifluoride, ethylene tetrafluoride, propylene hexafluoride, trifluorochloroethylene, vinyl fluoride and so on.

In accordance with the present invention, the dielectric layer consisting mainly of vinylidene fluoride resin may contain a small amount, preferably up to approximately 5% by weight, of a different kind of a polymer. Such polymer is not restricted to a particular one as long as the polymer does not adversely affect the film performance as a capacitor in accordance with the present invention.

The polymers to be employed with a mixture with the vinylidene fluoride resin for the coating layer in accordance with the present invention are thermoplastic resins substantially incompatible with the vinylidene fluoride resin and having a critical surface tension $Y_c$ of approximately 30 dyn/cm or higher. Such polymers may include, for example, thermoplastic polyester resins such as polyethylene terephthalate or polybutylene terephthalate, polycarbonates, polystyrenes or the like. Copolymers of such polymers or a mixture of the polymers and/or copolymers may also be employed.

The critical surface tension $Y_c$ is a measure for wettability of a polymer with a liquid. It can generally be said that a material having a low critical surface tension $Y_c$ is one which is unlikely to get wet with a liquid.

Table 1 below illustrates the critical surface tensions of polymers substantially incompatible with the vinylidene fluoride resins. The term "substantially incompatible" and in likewise related expression is intended herein to mean that an apparent phase separation is recognized where a mixture of a polymer with polyvinylidene fluoride in an amount of 1% by weight or more is fused and then cooled.

TABLE 1

| Polymers | Critical Surface Tension (dyn/cm) |
|---|---|
| Polyethylene | 31 |
| Polystyrene | 39 |
| Polycarbonate | 42 |
| Polyethylene terephthalate | 43 |

These polymers substantially incompatible with the vinylidene fluoride resin are admixed with the vinylidene fluoride resin. The amount of such polymer to be admixed with the vinylidene fluoride resin may be in the range from approximately 5 to 70% by weight, preferably from approximately 10 to 50% by weight. Where the amount of such polymer is too small, the otherwise improvable impregnating ability and withstand voltage performance will be impaired; where such amount is too large, a remarkable decrease in the dielectric constant of a laminated film is encountered. The mixing may be carried out in conventional manner, for example, by means of the melt blend method using an extruder.

It is herein to be noted that the vinylidene fluoride resins to be employed in the present invention may contain a small amount of conventional additives, such as a heat stabilizer, filler, voltage stabilizer or the like.

In accordance with the present invention, a composite or laminated film may be prepared by laminating the coating layer on one or two sides of the dielectric layer in conventional manner. A preferred procedure may be the coextrusion method which involves coextruding the dielectric layer comprising from 95 to 100% by weight of the vinylidene fluoride resin and the coating layer consisting essentially of the resin mixture by means of an extruder and integrally laminating the two layers in a die disposed nearby the outlet of the extruder to provide a film in the form of a sheet. The laminated film thus prepared is then stretch-oriented in conventional manner uniaxially or biaxially to form a uniaxially or biaxially stretch-oriented film.

The stretch-oriented film to be employed in accordance with the present invention is provided on its surface or surfaces with a finely embossed structure which can serve as permitting a favorable wetting with an impregnant such as an insulating oil. An electronic microscopic observation revealed that the fine polymer particles having a large critical surface tension are exposed on the surface of the stretch-oriented film, whereby the wettability on the surface of the otherwise sparingly wettable or little wettable film of the vinylidene fluoride resin is improved.

It will be considered that the finely embossed structure on the surface of the oriented film is originally formed at the time of preparation of the unoriented film because of a poor compatibility of the resin mixture to be employed in the coating layer and subsequently that such structure is further provided by stretch-orientation.

The stretch-oriented film to be employed in accordance with the present invention save a large amount of the resin to be mixed therewith as compared with a film prepared by extruding the resin mixture singly in a sheet form and then stretch-orienting the resulting sheet so that the orientability of film is decreased or the film is cut during manufacture. The use of the resin mixture for the coating layer does not adversely affect the dielectric constant and the withstand voltage performance of the film itself. Accordingly, the stretch-oriented film prepared in a manner as described hereinabove is particularly suitable for the preparation of a dielectric film for a capacitor element.

The stretch-oriented film is employed to provide a capacitor element in accordance with the present invention. The capacitor element may be formed by interposing the stretch-oriented film between a pair of electrodes such as aluminum foil and winding the laminated film on itself in a roll. The stretch-oriented film may be employed in a plurality between a pair of electrodes. Where a plurality of the stretch-oriented films are employed, it is not necessarily required that such dielectric film should be composed all of the stretch-oriented films. For example, where three of dielectric sheets are applied, the resulting capacitor element may be constructed so as to dispose two sheets of the stretch-oriented films inside the two electrodes and further interposing between the stretch-oriented films a stretch-oriented film of a single composition of polyvinylidene fluoride or an insulating paper sheet. In addition to a metal foil such as aluminum foil as set forth hereinabove, the electrodes may include, for example, a film deposited thereon with a metal. The use of such electrodes can provide a metalized film capacitor.

The capacitor element thus prepared is then impregnated in vacuo with an impregnant such as an insulating oil or the like. The insulating agent may include, for instance, an insulating oil of the mineral oil type such as one obtainable from fractions of oil; a synthetic oil composed of an aromatic hydrocarbon such as an alkylbenzene, alkylnaphthalene, diallylalkane, e.g., diallylethane or the like; a low dielectric material such as silicone oil, polybutene oil or a wax; and a high dielectric material such as castor oil, a phthalic acid ester, a phosphoric acid ester, fluorinated silicone oil or a fluorinated aromatic oil. These insulating oils may be employed singly or in admixture with the other. A small amount of a stabilizer may also be added thereto.

EXAMPLE 1

Vinylidene fluoride resin (trade name: Kureha KF Polymer #1100; manufactured by Kureha Kagaku Kogyo K.K.) was pelletized with an extruder by mixing it with a varying amount of a polycarbonate and melting the mixture at 260° C.

The pelletized resin mixture and a vinylidene fluoride resin separately pelletized were fed to an extruder and extruded at 270° C. to give a laminated sheet which in turn was stretch-oriented in both the widthwise and longitudinal directions so as to extend the area thereof to 12 times its original area, whereby the sheet having a thickness of 12 microns with the 3 microns thick coating layers coated on its both sides.

Using two laminated sheets and a sheet of aluminum foil as one unit, the two units were superposed on each other to give a capacitor element which in turn was impregnated with an alkylnaphthalene at 80° C. under a vacuo of $10^{-12}$ Torr to provide a capacitor having a static capacitance of approximately 0.5 $\mu$F.

The capacitor was then measured for its dielectric constant, corona starting voltage and breakdown voltage. The results are shown in Table 2 below.

Dielectric constant ($\bar{\epsilon}$) is determined by measuring the static capacitance of a sample capacitor at 20° C. and 1 KHz, the area of the capacitor and the thickness of the dielectric material between the electrodes and calculating the measured figures in conventional manner.

The corona starting voltage (V) is determined by measuring the partial discharge incepting voltage at 50 pps and a sensitivity of 10 pc by means of a low frequency partial discharge measuring device (manufactured by Dai-Nippon Densen K.K.).

The breakdown voltage (VDC) is one obtained by applying the both terminals of the capacitor at a pressure-raising velocity of approximately 100 V per second up to the breakdown of the capacitor.

Using varying amounts of polycarbonate, the capacitors were likewise prepared. Their performances are shown in Table 2.

COMPARATIVE EXAMPLE A

A sample capacitor was prepared in the same manner as in Example 1 with the exception that a biaxially stretch-oriented vinylidene fluoride resin film having a thickness of 12 microns was employed.

COMPARATIVE EXAMPLE B

A sample capacitor was prepared in the same manner as in Example 1 with the exception that there was employed a biaxially stretch-oriented film having a thickness of 12 microns in which a polycarbonate was homogeneously mixed in the amount of 20% by weight.

TABLE 2

|  | Amount of Polycarbonate (% by wt) | Dielectric constant ($\epsilon$) | Corona starting Voltage (V) | Breakdown Voltage (VDC) |
| --- | --- | --- | --- | --- |
| Example 1 | 5 | 9.1 | 2,300 | 9,800 |
| Example 1 | 10 | 8.8 | 2,500 | 10,600 |
| Example 1 | 15 | 8.5 | 2,550 | 11,500 |
| Example 1 | 30 | 8.2 | 2,500 | 11,300 |
| Example 1 | 50 | 7.5 | 2,450 | 10,400 |
| Example 1 | 70 | 7.0 | 2,400 | 10,200 |
| Comparative Example A | — | 9.3 | 1,800 | 7,800 |
| Comparative Example B | — | 5.5 | 2,200 | 9,000 |

EXAMPLE 2

The procedures of Example 1 were followed with the exception that various polymers each was mixed in the amount of 15% by weight with vinylidene fluoride resin and the resultant biaxially stretch-oriented film had on the both sides a coating layer having a thickness of 2 microns.

Using the film, a capacitor element was prepared in the same manner as in Example 1 and then impregnated with tricresyl phosphate at 80° C. under a vacuo of $10^{-2}$ Torr to give a capacitor having a static capacitance of 0.5 $\mu$F.

TABLE 3

|  | Kind of Polymer | Dielectric constant ($\epsilon$) | Corona Starting Voltage (V) | Breakdown Voltage (VDC) |
| --- | --- | --- | --- | --- |
| Example 2 | Polyethylene terephthalate | 9.5 | 2,500 | 11,300 |
| Example 2 | Polystyrene | 9.2 | 2,600 | 12,000 |
| Example 2 | Polybutylene terephthalate | 9.4 | 2,550 | 11,800 |
| Comparative Example | Polytetrafluoroethylene | 9.0 | 1,700 | 6,500 |

It is apparent from Table 3 that the polymers used in Example 2 can provide superior properties. In the instance where the polytetrafluoroethylene was employed, it is considered that a decrease in both the corona starting voltage and the breakdown voltage will be caused by the small critical surface tension $Y_c$.

What is claim is:

1. A capacitor in which an at least uniaxially stretch-oriented film comprises:
   (a) a dielectric layer comprising from 95 to 100% by weight of a vinylidene fluoride resin; and
   (b) a coating layer comprising a mixture of a vinylidene fluoride resin and a polymer substantially incompatible with the vinylidene fluoride resin and having a critical surface tension of 30 dyn/cm or higher, the dielectric layer and the coating layer being coextruded with the coating layer being disposed at at least one side of the dielectric layer.

2. The capacitor as claimed in claim 1 wherein the vinylidene fluoride resin is a homopolymer of vinylidene fluoride or a copolymer thereof with a copolymerizable monomer.

3. The capacitor as claimed in claim 2 wherein the copolymerizable monomer is an alkylene fluoride.

4. The capacitor as claimed in claim 3 wherein the alkylene fluoride is ethylene tetrafluoride, propylene hexafluoride, trifluorochloroethylene, ethylene trifluoride or vinyl fluoride.

5. The capacitor as claimed in claim 1 wherein said polymer which is substantially incompatible with the vinylidene fluoride resin and has said critical surface tension is thermoplastic polyester resin, a polycarbonate or polystyrene.

6. The capacitor as claimed in claim 5 wherein the thermoplastic polyester is polyethylene terephthalate or polybutylene terephthalate.

7. The capacitor as claimed in claim 1 wherein there is in the coating layer from approximately 5 to 70% by weight of said polymer.

8. The capacitor as claimed in claim 7 wherein there is in the coating layer from approximately 10 to 50% by weight of said polymer.

* * * * *